BOTTLE RECOGNITION APPARATUS

Filed Oct. 23, 1963

INVENTOR.
Paul J. Schneider,
BY
Paul & Paul
ATTORNEYS.

INVENTOR
Paul J. Schneider,
BY
Paul & Paul
ATTORNEYS.

3,358,552
BOTTLE RECOGNITION APPARATUS

Paul J. Schneider, 18 9th Ave., Haddon Heights, N.J. 08035

Filed Oct. 23, 1963, Ser. No. 318,217
4 Claims. (Cl. 88—14)

ABSTRACT OF THE DISCLOSURE

A mixed group of empty soft drink bottles of four different types, which are to be automatically recognized and sorted, are passed through a plurality of light beams, each of which is associated with a different function. Several of the bottles are clear glass but one of the clear bottles is characterized by a swirling design in its surface. A pair of photo-sensitive cells are spaced apart by distance which is related to the spacing between the swirls of the pattern of the bottle to be recognized. These photocells are positioned to receive a light beam through which the mixed group of bottles are passed. Signals from the pair of photo-cells are applied to a push-pull amplifier and then to a pair of comparator circuits for developing a recognition signal. Another of the light beams is associated with another photo-cell and associated circuitry to distinguish between white and green glass bottles. Still another of the beams is used with yet another photo-cell to determine whether or not the bottle has a label at a particular location. Electrical signals generated by the different photo-cells and circuitry associated with the different light beams are fed into a control flip-flop network. The system is provided with a separate output lead for each type of bottle, and signals appear on the different output circuits to indicate that a particular bottle has been recognized.

This invention relates to apparatus for automatically identifying and distinguishing between different types of bottles (or other articles having light transmissive or light reflective properties). Ordinarily, the recognition apparatus will be used to control an automatic selection or sorting means, thereby to set apart mechanically the different bottles according to type.

In my earlier filed co-pending patent application, Ser. No. 275,998, filed Apr. 26, 1963, now U.S. Patent 3,257,-897, issued June 28, 1966, entitled, "Bottle Recognition Apparatus," I describe and claim a system using interrupted or pulsating light beams, light sensitive devices, optic elements, electromechanical devices, and electronic circuits to generate electrical control or indicating signals. The apparatus described in my said earlier application is capable of distinguishing different types of bottles (or other articles) from among a mixed group which differ only in their light transmissive or reflective characteristics, such as color, or optical density, or optical refractive qualities. On the basis of such differences, electrical control signals are developed which indicate the results of this differentiation. The control signals may then be used to sort such items automatically into groups, according to predetermined criteria. In one important application, the apparatus of my earlier application, and also of the present application, is used in the sorting of soft drink bottles.

While not limited thereto, the system of my earlier application was shown and described as a system useful in recognizing and identifying three different types of bottles which differ from each other in their light transmissive properties.

The system of the present application will be described in connection with the recognition of four different types of bottles which differ from each other in light transmissive characteristics different from those described in my earlier application, requiring the use of several techniques not employed in my said earlier application.

The invention of the present application will be clearly understood from the following detailed description taken together with drawing, in which.

Figure 1:
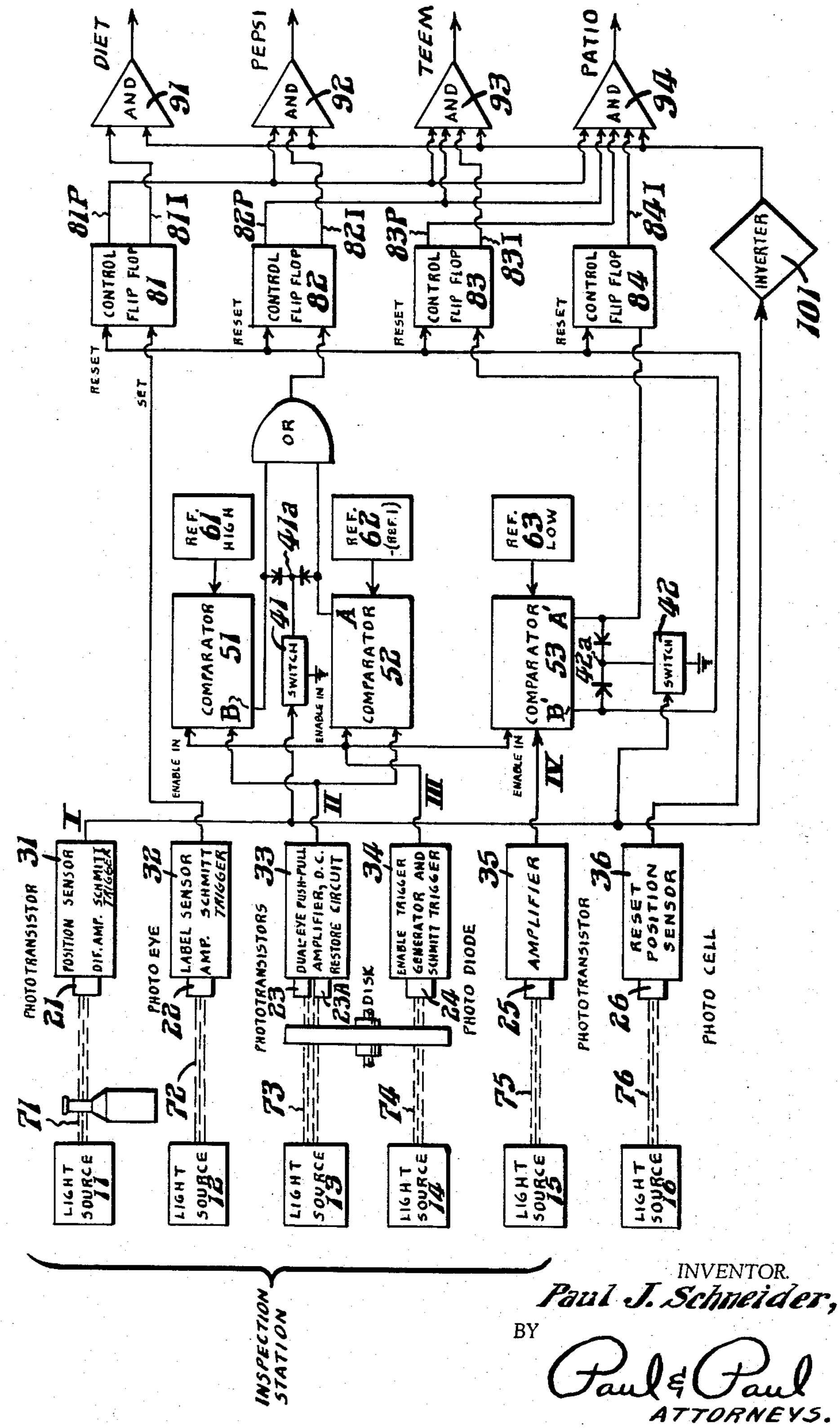
FIG. 1 is a block diagram of a system capable of identifying and distinguishing between four different types of bottles.

Referring now to FIG. 1, light sources 11, 12, 13, 14, 15 and 16 may be incandescent lamps or other suitable sources of light energized either by AC or DC electrical power. Ordinarily, an AC source is satisfactory, but in those cases where the developed signal is very small, it will be preferable to use a DC source to avoid the sixty-cycle modulation.

The light sources 11–16 generate light beams 71–76, respectively, which are directed to fall normally upon the photosensitive devices 21–26, respectively. Light beam 73, generated by source 13, is sufficiently wide to also fall on phototransistor 23*a*, the twin of a dual-eye combination. Light responsive devices 21, 23, 23A and 26 are preferably phototransistors and are used to detect variations in the light intensity of the beams falling thereon caused by an intercepting bottle as it moves through the light beam. Device 24 may be merely a photo-diode, and devices 22 and 26 may be photo-cells, as for example, cadmium sulphide photo-cells.

Figure 3:
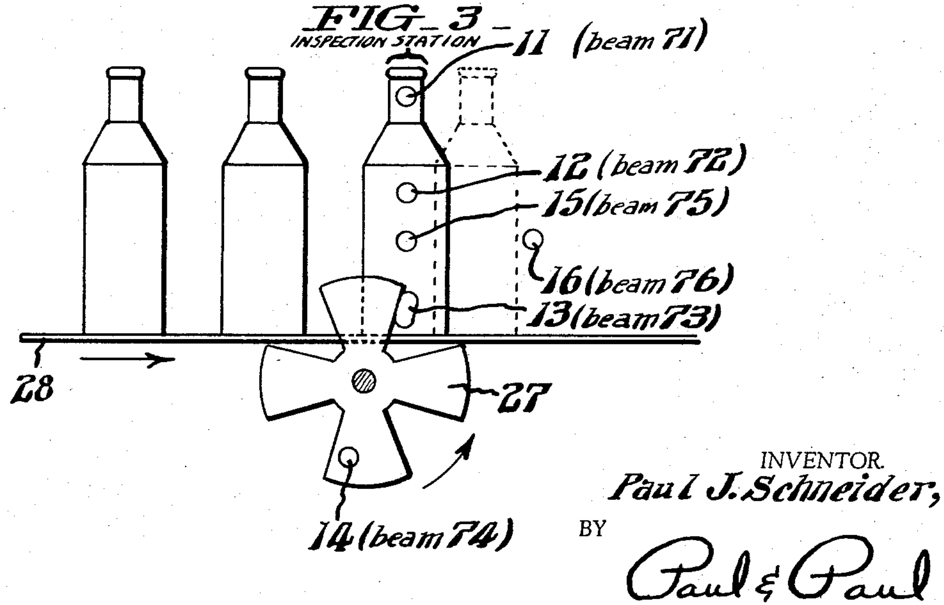
FIG. 3 is a diagrammatic elevational view illustrating the positions of the various light sources relative to the chopper disk and to the bottle as it passes through the inspection station.

As indicated by FIGS. 1 and 3, five of the six light beams are transversely across the path of the bottle to be identified as it is moved through and beyond the inspection station. Light beam 74 is out of the path of the bottle. This beam 74 is illustrated in FIG. 3 as being below, but may be either below or above, the bottle path, or in any other position where it is not intercepted by the bottle as the bottle is moved along. Since beam 74 is not modified by the bottle, the cell 24, as previously indicated, may be merely a photo-diode used to detect the presence and absence of light as the light beam is interrupted by the rotating chopper disk 27.

Disk 27, which functions as a light-beam chopper for the beams 73 and 74, may be a slotted metal disk rotatable on a shaft driven by a motor (not shown) at a convenient speed which, for example, may be of the order of 3350 revolutions per minute. The speed is not critical. The disk is slotted, a four-blade four-slot disk being shown in FIG. 3. A disk having a larger number of blades and slots may, however, be used. The disk 27 is located in the paths of the light beams 73 and 74, and as it rotates, the blades of the disk periodically interrupt these light beams 73 and 74, as received by the photosensitive devices 23, 23A and 24. The disk 27 may preferably be positioned close to the photo-devices 23, 23A, 24 so as to tend to reduce the amount of ambient light reaching these cells. A mechanical chopper such as disk 27 is preferred because it provides a sharper cutoff, but pulsating sources of light may be employed in lieu of the disk chopper to provide the interrupted light beams 73 and 74.

The reason for using an interrupted light beam is fully discussed in my earlier application, Ser. No. 275,998 now U.S. Patent 3,257,897, and will be but briefly mentioned here. Stated briefly, by employing a chopped beam the dark level may be used by the sensing system as the reference level. This facilitates distinguishing between two levels of bottle-intercepted light which pass through two different types of bottles where the two levels of intercepted light are substantially closer to the dark level than to the full illumination level.

In FIG. 1, in response to the chopped or interrupted light falling on the photo-devices 23, 23A and 24, the dual-eye push-pull sensing amplifier and DC restorer circuit 33, and the timing enable pulse generator 34, each developes a train of output pulses, identified as trains II and III, respectively. These pulse trains are always present at the outputs of circuits 33 and 34 so long as the light sources 13 and 14 are energized and the disk 27 is rotating.

The time relation between the pulses of the two pulse trains II and III is determined by the relative physical positions of the photo-devices 23, 23A and 24 with respect to the slots of the chopper disk 27. As indicated by FIG. 3, the photo-devices 23, 23A and 24 are so positioned relative to the slots and blades of the disk that the light beams 73 and 74 are not interrupted and restored in the exact time coincidence. Rather, the interrupted light beam to diode 24 is not restored until shortly after the light beam to photo-transistors 23 and 23A has been restored. As a result, the leading edge of the pulses in the timing pulse train III from the enable generator 34 occurs after the leading edge of the corresponding information pulse in train II. More specifically, the pulses are so timed that the leading edge of the timing pulse in train III occurs after the corresponding information pulse in train II has reached full amplitude. Once the position of elements 23, 23A and 24 are set relative to the disk 27, the two pulse trains II and III will remain locked in the same time relation, since both are generated by the same spinning disk 27. This arrangement insures that the amplitude of each pulse in the information pulse train II has reached a steady state value before it is sampled by succeeding circuitry, as will be described.

The sensing circuit 33 may preferably comprise a push-pull amplifier followed by a DC restorer circuit which employs the dark level as a reference. These circuits may preferably be transistor circuits of known conventional type. An AC coupling is necessary in the amplifier to prevent changes in ambient light and temperature at the photo elements 23, 23A from causing large DC output changes. The DC restorer circuit is then used at the output to re-establish the dark level reference. The advantages of the AC coupling and DC restoration are more fully discussed in my earlier application Ser. No. 275,-998 and need not be repeated here.

The timing or enabling pulse generator 34 may be a transistor switch of known type, such as a Schmitt trigger, which is triggered by the signal developed by the action of the interrupted light beam 74 falling upon the photodiode element 24.

The position sensor 31 consists of an amplifier, preferably a transistorized difference amplifier, driving a Schmitt trigger circuit, both of which are known types of circuit. The difference amplifier is driven by the electrical output of the phototransistor element 21, developed in response to light beam 71, as modified by an intercepting bottle. A difference amplifier is preferably used so as to compensate for drift in the signal from the phototransistor 21 due to changes in the ambient temperature. The Schmitt trigger circuit is used to provide a high input impedance. It also gives an output signal having a fast rise time.

The output signal of the Schmitt trigger of position sensor 31 is a pulse I which is triggered when the neck of the bottle intercepts and modifies the light beam 71. This pulse I functions as a gate pulse. It is not synchronized with respect to the pulse trains II and III. The pulse I output from the position sensor 31 exists so long as the light beam 71 is intercepted by the neck of the bottle. The travel rate of the bottle through the beam 71 is so chosen relative to the interruption rate of the chopped beam 73 that the pulse I has a duration sufficiently long to span at least several, preferably at least 10, consecutive pulses of each of the pulse trains II and III. It will be understood that the timing pulses of the pulse train III are of substantially constant amplitude since the beam 74 is not modulated by the bottle. It is merely an interrupted beam.

Gate switches 41 and 42 are substantially identical single transistor circuits. When the gate pulse I from position sensor 31 is not present, switches 41 and 42 become short circuits to ground, switch 41 grounding the outputs of the comparators 51 and 52, and switch 42 grounding the output of comparator 53. Under this condition, no pulses are applied to the control flip flops 82, 83 or 84. Whenever the gate pulse I is present, each of the switches 41 and 42 becomes a very high impedance to ground, and the output signals from the comparators 51, 52 and 53 are not shorted to ground and may be applied to the control flip flops 82, 83 and 84.

The comparators 51, 52 and 53 are known types of circuits, and may be similar to each other. Each is supplied with a regulated reference voltage of different value. Each comparator may, for example, comprise a transistor flip flop whose condition, when the associated switch is closed, is determined by a second pair of transistors to one of which the reference voltage is applied and to the other of which the input signals are applied. The characteristics of the comparison circuits 51, 52 and 53 are, therefore, such that the amplitude of the pulses in the pulse trains II and IV (the latter being from amplifier 35 not yet described) are compared against the regulated but adjustable reference voltages 61, 62 and 63, respectively. In the present examples, it is assumed that the amplitude of the reference voltage 61 is higher than that of the reference voltage 63, and that reference voltage 62 is equal in magnitude of that of 61 but of opposite sign.

The control flip flops 81, 82, 83 and 84 are reset by signals from the position sensor 36 whose light source 16, light beam 76 and photocell 26 are located a short distance beyond the inspection station so that beam 76 is intercepted by a bottle after it leaves the inspection position, and before the next bottle intercepts beam 71. The arrangement allows time for an electro-mechanical sorting gate (not per se part of the present invention) to be activated by the level change at the outputs of the control flip flops during the time period that the next bottle is moving into the inspection station.

Position sensor 36 may be substantially identical in make-up to position sensor 31 described hereinabove. On the other hand, position sensor 36 and its associated light source, light beam and photocell may, if desired, be replaced by a mechanical switch physically actuated by the bottle as it moves away from the inspection position.

As indicated by FIG. 3, light source 12 is positioned at a somewhat higher elevation than the light source 13 so that the light beam 72 will be intercepted by the bottle at a level on the bottle above that at which the bottle intercepts the light beam 73. As will be described, one of the bottles to be identified, a Pepsi Diet-Cola bottle, is characterized by having a label at the elevation of the light beam 72, and this label intercepts the beam 72. This interception is sensed by the photo-cell 22 and the label sensor 32 generates an output signal in response thereto. Label sensor 32 may be generally similar to position sensor 31, and may comprise an amplifier followed by a Schmitt trigger circuit. The output of the label sensor 32 is applied directly to the control flip flop 8 as a set pulse.

In the particular arrangement illustrated in FIG. 3, the light source 15 is located below the light source 12 but above the light source 13 so that the beam 75 is not intercepted either by the chopper disk or by the label on the Diet-Cola bottle. The interception of beam 75 by a bottle is sensed by the photo-cell 25 and a signal is developed by the photo-sensitive amplifier 35 and applied to the comparator circuit 53.

It should be understood that the particular arrangement of light sources illustrated in FIG. 3 is not to be considered a limitation, and that other suitable positional arrangements may be employed.

The operation of the system shown in FIG. 1 will now be described. It will be assumed that it is desired to identify and distinguish the following four different types of Pepsi-Cola bottles: (1) A Pepsi-Cola bottle, a white glass bottle characterized by a swirled surface design; (2) A Teem bottle, a green glass bottle, (3) A Patio bottle, a white glass bottle characterized by a diamond pattern surface configuration; (4) A Diet-Cola bottle, a white glass bottle having a diamond pattern similar to the Patio bottle but having in addition a larger light-blocking label at an upper position on the bottle (at the level of beam 72 of the present system).

As the bottles of a mixed group of bottles are transported one by one, as by a conveyor belt 28 (FIG. 3) to the inspection station, the neck of the bottle will intercept and modify the magnitude of the light beam 71 falling on the phototransistor 21. The difference amplifier of position sensor 31 will produce an output, the Schmitt trigger circuit will be triggered, and a gate pulse I will be delivered to the transistor gate switches 41 and 42. Switches 41 and 42 will be actuated by the gate pulse I and will switch to a condition in which each switch presents a very high impedance to ground from the junction points *41a*, *42a* of the diodes. Thus, the outputs of the comparator circuits 51, 52 and 53 will not be grounded by the switches 41, 42, but will be delivered to the control flip flops 82, 83 and 84, respectively. Stated another way, the function of the gate switches 41 and 42 is to block the outputs of the comparator circuits, except when, and so long as, the beam of light 71 is being intercepted by the neck of a bottle. During the time that the bottle neck is intercepting beam 71, the beams of light 72, 73 and 75 from light sources 12, 13 and 15, respectively, are being directed laterally through the center part of the same bottle and are being received respectively on the photo-devices 22, 23 and 23A, and 25.

The arrangement just described, involving a gate circuit which is closed except when the center part of the bottle is in the light beam 72, 73 and 75, guarantees that the amplitude of the pulses from the sensing circuits which respond to these light beams are valid representations of the light response of the type of bottle being inspected. It does this by blocking from the output of the comparators any ambiguous signals which might be generated at the peripheral edges of the bottles as the bottles pass into and out of the light beams 72, 73 and 75. This particular feature is shown and claimed in my earlier co-pending application Ser. No. 275,998.

If the particular bottle being inspected is any one of the three types, Pepsi, Teem or Patio, the light beam 72 from the light source 12 will pass through the bottle with but relatively little attenuation. The Diet-Cola bottle, however, has a large permanent light-blocking label at an elevation corresponding to that of the light beam 72, and this label substantially blocks the beam 72. The change in the amount of light received by the photo-cell 22, when a Diet-Cola is being scanned, is sensed by the photo-cell and an output pulse is generated and delivered from the label sensor 32 and applied directly as a set pulse to the control flip flop 81. This causes the flip flop output lead 81I to change from an inhibit level to a prime level, and causes the output lead 81P to change from a prime to an inhibit level. Thus, AND gate 91 becomes primed while AND gates 92, 93 and 94 become inhibited.

Attention is called to the fact that during the time a bottle is being inspected, such as is now being described, all four of the output AND gates 91–94 are inhibited by the signal level received from inverter 101, and this condition continues so long as the output signal I is being received from the position sensor 31. Stated another way, so long as the neck of a bottle is intercepting the light beam 71, all of the output AND gates 91–94 are inhibited. This technique prevents a premature and possibly incorrect indicating signal from being delivered from an output gate. This technique is described and claimed in my earlier filed co-pending application Ser. No. 275,998, previously referred to.

In the system shown in FIG. 1, the signal developed by the label sensor 32, in recognition of a Diet-Cola bottle which has a label positioned to block the beam 72, is developed as soon as the bottle enters the beam 72, and is not limited to the time period that the neck of the bottle is also intercepting light beam 71. This is permissible because the signal developed by the blocking label is a yes-no type of signal which requires no further comparison and makes it unnecessary to limit the developed signal to the center portion of the bottle. Stated another way, the system is able to decide that a Diet-Cola bottle has been presented as soon as the beam 72 is blocked. This developed signal sets the control flip flop 81 substantially immediately, and primes the AND gate 91, but no output signal passes through the AND gate 91 until after the neck of the bottle has passed through the light beam 71.

If desired, the light beam 72 could also be so positioned as to be interrupted by the rotating slotted disk 27, but this is unnecessary since the difference between the light received by the photo-cell 22 when beam 72 is intercepted by a Pepsi, Teem or Patio type of bottle and the light received when the beam 72 is intercepted by a Diet-Cola bottle is sufficiently great to make the employment of the chopped-beam technique unnecessary. As stated previously above, the purpose of the chopped-beam technique is to permit a comparison of several signals with the dark level rather than with the light level of the beam.

Assume now that the bottle being presented to the inspection station is a Pepsi bottle. This bottle is characterized by being made of white glass but having a swirling design in its surface. If, the bottle being inspected is either a Teem, Patio or Diet-Cola bottle, the bottle surface is substantially smooth at the level of light beam 73 and substantially equal light is received by the twin photo-transistors 23 and 23A when the wide beam 73 is intercepted by that portion of the bottle corresponding to a downward extension of the narrow neck portion, as indicated by the location of wide beam 73 in FIG. 3. If, however, the bottle is a Pepsi bottle, the swirls cause an unequal amount of light to be presented to each of the twin photo-transistors 23 and 23A. This is because the swirls have a magnifying effect on the beam. Each of the photo-transistors 23 and 23A is connected in the manner shown in FIG. 2, later described. The push-push amplifier of sensor 33 now develops a large output which alternately is pushed and pulled positively and negatively. Depending upon the particular rotational or angular position of the Pepsi-Cola bottle, the positive and negative excursions may both be large, or the positive excursion may be large with a small negative excursion, or the negative excursion may be large and the positive excursions small.

The signals developed by the push-pull amplifier and DC restorer of sensor 33 are applied in parallel to comparator circuits 51 and 52. The comparator circuit 51 produces an output signal on output terminal B when the analogue input from the sensor 33 is more positive than the value of reference 61. An output signal occurs on the output terminal A of comparator 52 when the analogue input from sensor 33 is more negative than the value of the reference 62. As previously indicated, the reference 62 is a negative value approximately equal in magnitude to reference 61 which is positive. An output signal from either one of comparators 51 and 52 is necessary in order to indicate that a Pepsi-Cola bottle is being inspected. An output signal from either one of the comparator circuits 51 or 52 will set the control flip flop 82 and change the output lead 82I from an inhibit to a prime level, thereby priming the output AND gate 92. At the same time, the output lead 82P changes from a prime level to an inhibit level, thereby inhibiting the output AND gates 93 and 94. This technique represents an illustration of the higher priority or lockout feature of the system, in which an output will be obtained from only one of the output AND gates. That is to say, if either one or both of the control flip flops 83 and 84 should become set at the same time that control flip flop 82 is set, only one output will be delivered from the output AND gates, and that will be from the output AND gate 92, since the set control flip flop 82 will be applying inhibit signals to the output AND gates 93 and 94. This primary lockout technique is described in my earlier filed co-pending application, Ser. No. 275,998.

As also indicated previously, until the neck portion of the bottle leaves the light beam 71, all four of the output AND gates 91–94 are inhibited by the signal I applied from the neck position sensor 31 through the inverter 101. If this technique were not employed, false output signals from the AND gate 92 might be obtained from Patio and Teem bottles as these types of bottles moved into and out of the light beam 73.

In the system of FIG. 1, recognition of and distinguishing between the Teem and Patio bottles is accomplished by the light beam 75, the photosensitive device 25, the amplifier 35, the comparator 53, and associated circuitry.

The signal IV developed by the photosensitive amplifier 35 is applied to the comparator 53. The signal IV developed by a Teem bottle, which is green glass, is always more positive than the value of reference 63, whereas a white glass bottle, such as a Patio bottle, will produce an output from amplifier 35 which is always less positive than the value of the reference 63. The more positive signal developed by the Teem bottle and applied to the comparator 53 produces an output on terminal B′ of the comparator 53 which is applied, when the switch 42 is in its high impedance condition, to the control flip flop 83. This signal, when applied, changes the flip flop 83 to a condition such that the output lead 83I changes from an inhibit to a prime level, thereby priming the AND gate 93. The white glass bottles, such as the Patio bottle, apply to the comparator 53 an input signal IV which is always more negative than the value of reference 63. This produces an output on the output lead A′ of comparator 53, which when the switch 42 permits, is applied to the control flip flop 84 to shift the flip flop to a state such that its output lead 84I changes from the inhibit level to the prime level, thereby priming the AND gate 94. If desired, comparator 53 may be a Schmitt trigger with a pre-set firing point equivalent to a reference source.

It will be noted that any of the white glass bottles, Pepsi, Diet-Cola and Patio, will produce a signal from amplifier 35 which will set flip flop 84 and thus prime gate 94. If the white glass bottle producing such a condition is either a Diet-Cola or Pepsi bottle, an additional signal will be developed by either sensor 32 or 33 and either flip flop 81 or 82 will be set, thereby applying an inhibit level signal to AND gate 94. On the other hand, if the white glass bottle is a Patio bottle, no other signal will be developed and neither of the flip flops 81 or 82 will be set. Thus, the AND gate 94 will receive prime level signals from the three control flip flops 81, 82 and 83, each of which will be in a reset state. It will be seen that, after the neck of the bottle has cleared the beam 71, an output will be delivered from the AND gate 94 only if the bottle being inspected is a Patio bottle.

It will now be understood, from the foregoing explanation, that the system shown in FIG. 1 is adapted to deliver an output signal from only one of the AND gates 91–94 at a time, that (1) if the bottle presented to the inspection station is a Diet-Cola bottle an output will be delivered by the AND gate 91, (2) if the bottle is a Pepsi-Cola bottle, an output will be delivered from the AND gate 92, (3) if the bottle is a Teem bottle an output will be delivered from the AND gate 93, and (4) if the bottle is a Patio bottle an output will be delivered from AND gate 94.

Figure 2:
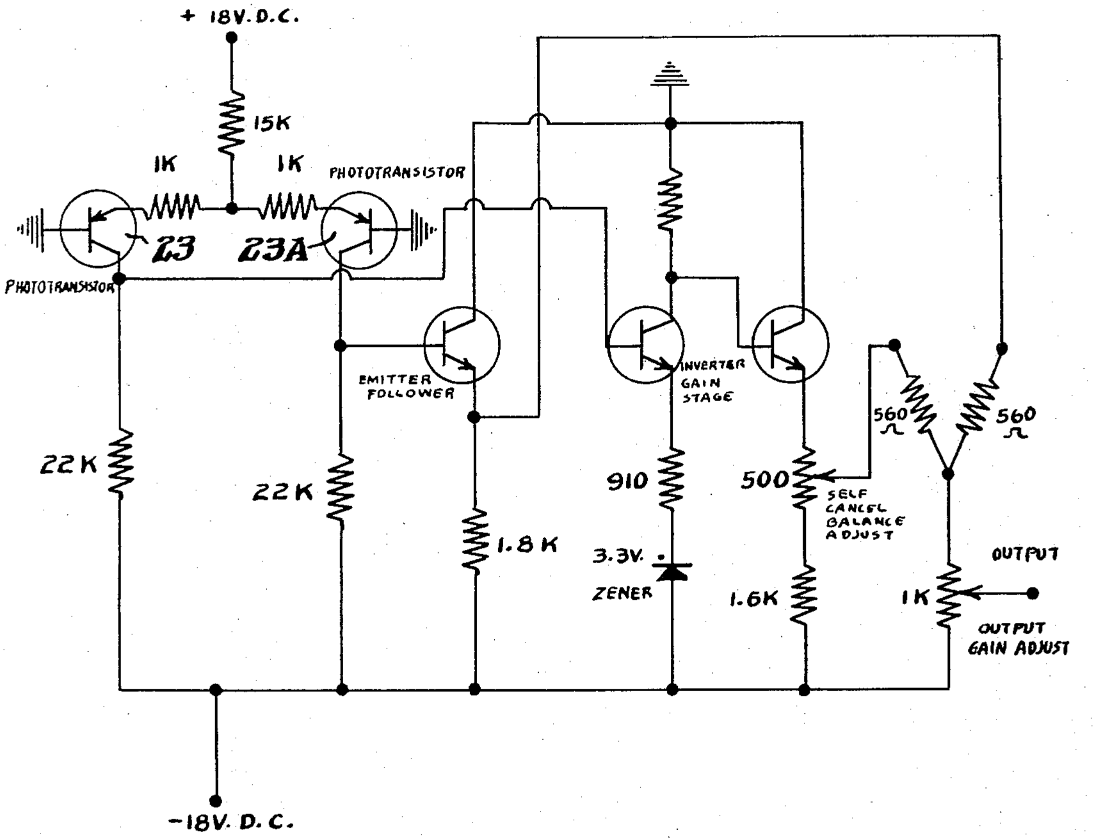
FIG. 2 is a schematic diagram of the circuit of the dual-eye push-pull amplifier employed in connection with the recognition of one of the types of bottles.

FIG. 2 is a schematic of a circuit suitable for use as the twin-eye push-push amplifier of sensor 33. The two phototransistors 23 and 23A of the twin-eye arrangement are connected as transistors would be connected in a conventional difference amplifier. The output is adjustable to zero when equal light is presented to each of the phototransistors 23, 23A. When the beam 73 is intercepted by a clear glass bottle, whether white or other color, equal light is presented to each photo-transistor, and the amplifier output remains zero. This is the situation when a Diet-Cola or Patio or Teem bottle intercepts the beam 73, since the beam 73 is so located that it passes through these types of bottles at a relatively clear glass portion below their respective labels. However, as previously described, the swirls of a Pepsi-Cola bottle cause unequal amounts of light to be presented to each of the twin phototransistors, and the difference amplifier develops a relatively large output signal II which is pushed and pulled positively and negatively. The particular rotational position of the Pepsi-Cola bottle determines whether both the positive and negative excursions are large, or whether one sign excursion is large. If only the positive excursion is large, then comparator 51 delivers an output at its terminal B (FIG. 1). If only the negative excursion is large, then comparator 52 develops an output at its terminal A (FIG. 1). If both the positive and negative excursions are large, both comparators 51 and 52 develop an output signal.

While the preferred embodiment of this invention has been described in some detail, it will be obvious to one skilled in the art that various modifications may be made without departing from the invention as hereinafter claimed.

Having described my invention, I claim:

1. Apparatus for recognizing and distinguishing between light transmissive unit articles according to whether the article has a smooth clear surface or a pattern surface, said apparatus comprising an inspection station having: means for generating a light beam; a pair of photosensitive devices spaced apart by a distance which is related to the pattern surface to be recognized but positioned sufficiently close together to receive light from said beam and to generate electrical signals in response thereto; means for moving unit articles to be recognized one by one transversely through said light beam at a relatively constant speed to modify the light received by said pair of photosensitive devices; and electrical means, including first and second comparitors having equal reference values but of opposite sign, coupled to the outputs of said photosensitive devices for developing a recognition signal only when the electrical signals generated by either one of said photosensitive devices is substantially larger than the signals developed by the other of said photosensitive devices, said recognition signal, when developed, indicating that a bottle having a pattern surface has been recognized.

2. Apparatus according to claim 1 characterized in that said electrical means for developing a recognition signal also includes a push-pull amplifier coupled between the outputs of said photosensitive devices and said first and second comparitors for amplifying the unequal signals developed by said photosensitive devices.

3. Apparatus according to claim 2 characterized in the provision at said inspection station of means for generating a second light beam, another photosensitive device positioned to receive light from said second beam and to generate electrical signals in response thereto, said second light beam being in the path of unit articles to be recognized, means, including a third comparator circuit, coupled to said another photosensitive device for generating a recognition signal in response to the variation in light caused by the passage of a bottle through said second light beam; and inhibit means for inhibiting a recognition signal from one of said recognition-signal generating means when a recognition signal is also generated by the other of said recognition-signal generating means.

4. Apparatus as claimed in claim 3 further characterized in the provision at said inspection station of a third means for generating a third light beam, still another photosensitive device positioned to receive light from said third light beam for generating an electrical signal in response thereto, said light beam being positioned to be intercepted only by the neck portion of the bottles moved therethrough, and means coupled to said still another photosensitive device for utilizing the signal generated thereby for inhibiting a recognition signal from either said recognition-signal generating means so long as the neck portion of said bottle is intercepting said third light beam.

References Cited

UNITED STATES PATENTS

| | | | |
|---|---|---|---|
| 2,192,580 | 3/1940 | Sachtelben | 88—14 |
| 2,517,554 | 8/1950 | Frommer | 88—14 |
| 3,094,213 | 6/1963 | Wyman | 250—223 |
| 3,133,638 | 5/1964 | Calhoun | 88—14 |

JEWELL H. PEDERSEN, *Primary Examiner.*

C. E. QUARTON, *Assistant Examiner.*